(12) United States Patent
Zhou

(10) Patent No.: US 10,812,599 B2
(45) Date of Patent: Oct. 20, 2020

(54) METHOD AND SYSTEM FOR CREATING VIRTUAL NON-VOLATILE STORAGE MEDIUM, AND MANAGEMENT SYSTEM

(71) Applicant: Huawei Technologies Co., Ltd., Shenzhen (CN)

(72) Inventor: Yuanqing Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 160 days.

(21) Appl. No.: 15/639,785

(22) Filed: Jun. 30, 2017

(65) Prior Publication Data

US 2017/0302742 A1 Oct. 19, 2017

Related U.S. Application Data

(63) Continuation of application No. PCT/CN2016/075959, filed on Mar. 9, 2016.

(30) Foreign Application Priority Data

Mar. 18, 2015 (CN) .......................... 2015 1 0120673

(51) Int. Cl.
*H04L 29/08* (2006.01)
*G06F 3/06* (2006.01)
(52) U.S. Cl.
CPC ............ *H04L 67/141* (2013.01); *G06F 3/067* (2013.01); *G06F 3/0607* (2013.01);
(Continued)
(58) Field of Classification Search
CPC ..................................................... H04L 67/141
(Continued)

(56) References Cited

U.S. PATENT DOCUMENTS 6,501,761 B1 * 12/2002 Pannell ............. H04L 29/12009
370/403
6,600,749 B1 * 7/2003 Hayball .................. H04L 41/16
370/351
(Continued)

FOREIGN PATENT DOCUMENTS

CN 101115070 A 1/2008
CN 101452411 A 6/2009
(Continued)

OTHER PUBLICATIONS

Microsoft Computer Dictionary, "non-volatile memory", 5th edition, p. 371, 2002 (Year: 2002).*
(Continued)

*Primary Examiner* — Ondrej C Vostal
(74) *Attorney, Agent, or Firm* — Slater Matsil, LLP

(57) ABSTRACT

A method and a system for creating a virtual non-volatile storage medium, and a management system. The method is: receiving, by a CPU, a creation request message that is sent by a client and that is for creating a virtual non-volatile storage medium corresponding to a physical non-volatile storage medium, where the creation request message carries a blade server identifier; forwarding, by the CPU, the creation request message to a target blade server identified by the blade server identifier; and receiving, by the CPU, attribute information sent by the target blade server, and sending the attribute information to the client, such that the client creates, according to the attribute information, a virtual non-volatile storage medium that can be uniquely accessed by the target blade server.

21 Claims, 5 Drawing Sheets

(52) U.S. Cl.
CPC .......... *G06F 3/0664* (2013.01); *G06F 3/0674* (2013.01); *G06F 3/0679* (2013.01); *H04L 29/08* (2013.01); *H04L 67/1097* (2013.01); *H04L 67/322* (2013.01); *H04L 69/324* (2013.01)

(58) Field of Classification Search
USPC ........................................................ 709/227
See application file for complete search history.

(56) References Cited

U.S. PATENT DOCUMENTS

| | | | | |
|---|---|---|---|---|
| 6,931,475 | B2* | 8/2005 | Huang | G06F 3/023 |
| | | | | 361/679.18 |
| 7,240,364 | B1* | 7/2007 | Branscomb | H04L 29/12113 |
| | | | | 726/5 |
| 7,385,983 | B2* | 6/2008 | Chen | H04L 29/12377 |
| | | | | 370/392 |
| 7,512,830 | B2* | 3/2009 | Chu | G06F 11/2028 |
| | | | | 714/4.11 |
| 7,539,631 | B1* | 5/2009 | El-Haj | G06Q 30/06 |
| | | | | 705/26.1 |
| 7,694,298 | B2* | 4/2010 | Goud | G06F 9/45537 |
| | | | | 703/24 |
| 8,010,679 | B2* | 8/2011 | Low | G06F 3/1415 |
| | | | | 709/227 |
| 8,166,179 | B2* | 4/2012 | Pickens | H04L 29/12405 |
| | | | | 709/227 |
| 8,291,116 | B2* | 10/2012 | Read | H04L 29/06027 |
| | | | | 709/245 |
| 8,316,457 | B1* | 11/2012 | Paczkowski | H04L 67/306 |
| | | | | 726/27 |
| 8,699,499 | B2* | 4/2014 | Mulligan | G06F 9/45533 |
| | | | | 370/395.53 |
| 8,799,557 | B1* | 8/2014 | Chen | G06F 12/0638 |
| | | | | 711/103 |
| 8,880,687 | B1* | 11/2014 | Chandrachari | H04L 43/065 |
| | | | | 709/224 |
| 8,929,255 | B2* | 1/2015 | Hernandez | H04L 12/4641 |
| | | | | 370/259 |
| 8,949,473 | B1* | 2/2015 | Haywood | G11C 8/00 |
| | | | | 710/1 |
| 9,712,455 | B1* | 7/2017 | Mittal | H04L 47/762 |
| 10,116,622 | B2* | 10/2018 | DeCusatis | H04L 63/0209 |
| 2004/0081104 | A1* | 4/2004 | Pan | G06F 9/4405 |
| | | | | 370/254 |
| 2004/0153579 | A1* | 8/2004 | Shih | G06F 3/0607 |
| | | | | 710/1 |
| 2004/0249975 | A1* | 12/2004 | Tuck | H04L 29/12066 |
| | | | | 709/245 |
| 2005/0010709 | A1* | 1/2005 | Davies | G06F 11/1456 |
| | | | | 710/305 |
| 2005/0283549 | A1 | 12/2005 | Gibson et al. | |
| 2006/0003638 | A1 | 1/2006 | Huang et al. | |
| 2006/0095595 | A1 | 5/2006 | Dalton et al. | |
| 2006/0136704 | A1* | 6/2006 | Arendt | G06F 9/4405 |
| | | | | 713/2 |
| 2006/0155775 | A1* | 7/2006 | Yamasaki | G06F 3/061 |
| 2006/0167886 | A1 | 7/2006 | Kantesaria et al. | |
| 2006/0184349 | A1* | 8/2006 | Goud | G06F 9/45537 |
| | | | | 703/24 |
| 2007/0147267 | A1* | 6/2007 | Holland | H04L 67/1097 |
| | | | | 370/252 |
| 2007/0171921 | A1* | 7/2007 | Wookey | G06F 3/1415 |
| | | | | 370/401 |
| 2007/0180226 | A1* | 8/2007 | Schory | H04L 29/12481 |
| | | | | 713/153 |
| 2007/0208809 | A1* | 9/2007 | Westman | H04W 4/06 |
| | | | | 709/205 |
| 2007/0233455 | A1* | 10/2007 | Zimmer | G06F 9/546 |
| | | | | 703/27 |
| 2007/0249291 | A1* | 10/2007 | Nanda | H04W 36/0083 |
| | | | | 455/73 |
| 2008/0104236 | A1* | 5/2008 | Yoshikawa | H04L 29/12028 |
| | | | | 709/224 |
| 2008/0168163 | A1* | 7/2008 | Kurokawa | G06F 9/5027 |
| | | | | 709/223 |
| 2008/0250484 | A1* | 10/2008 | Chong | H04L 63/0245 |
| | | | | 726/7 |
| 2009/0172125 | A1* | 7/2009 | Shekhar | G06F 11/2025 |
| | | | | 709/215 |
| 2009/0282101 | A1 | 11/2009 | Lim et al. | |
| 2010/0175123 | A1* | 7/2010 | Karino | H04L 29/12377 |
| | | | | 726/12 |
| 2010/0198979 | A1* | 8/2010 | Pickens | H04L 29/12405 |
| | | | | 709/231 |
| 2010/0205152 | A1* | 8/2010 | Ansari | H04L 12/2814 |
| | | | | 707/654 |
| 2010/0217871 | A1 | 8/2010 | Gammon | |
| 2011/0209064 | A1* | 8/2011 | Jorgensen | G06F 9/452 |
| | | | | 715/733 |
| 2011/0261071 | A1* | 10/2011 | Ganetakos | G06Q 10/00 |
| | | | | 345/619 |
| 2011/0270850 | A1* | 11/2011 | Wana | H04L 67/22 |
| | | | | 707/749 |
| 2011/0276925 | A1* | 11/2011 | Tumanov | G06Q 10/109 |
| | | | | 715/856 |
| 2011/0289500 | A1* | 11/2011 | Strutt | G06F 3/067 |
| | | | | 718/1 |
| 2012/0089666 | A1* | 4/2012 | Goswami | G06Q 10/103 |
| | | | | 709/203 |
| 2012/0117644 | A1* | 5/2012 | Soeder | G06F 21/554 |
| | | | | 726/22 |
| 2012/0147894 | A1* | 6/2012 | Mulligan | G06F 9/45533 |
| | | | | 370/395.53 |
| 2012/0151107 | A1* | 6/2012 | Cai | H04L 45/02 |
| | | | | 710/107 |
| 2012/0210416 | A1* | 8/2012 | Mihelich | H04L 63/0218 |
| | | | | 726/11 |
| 2012/0222028 | A1* | 8/2012 | Nakajima | H04L 29/12254 |
| | | | | 718/1 |
| 2012/0271903 | A1 | 10/2012 | Luna | |
| 2012/0317319 | A1* | 12/2012 | Myrah | H04L 67/288 |
| | | | | 710/74 |
| 2013/0326028 | A1* | 12/2013 | Cox | G06F 9/4856 |
| | | | | 709/220 |
| 2014/0075006 | A1* | 3/2014 | Cherian | H04L 41/04 |
| | | | | 709/223 |
| 2014/0095826 | A1* | 4/2014 | Rajagopal | H04L 67/1097 |
| | | | | 711/170 |
| 2014/0113655 | A1* | 4/2014 | Kang | H04L 5/0044 |
| | | | | 455/456.2 |
| 2014/0157298 | A1* | 6/2014 | Murphy | H04N 21/64322 |
| | | | | 725/14 |
| 2014/0195573 | A1* | 7/2014 | Nakagawa | G06F 3/0605 |
| | | | | 707/827 |
| 2014/0244851 | A1* | 8/2014 | Lee | H04L 12/4641 |
| | | | | 709/228 |
| 2014/0259015 | A1* | 9/2014 | Chigusa | G06F 9/45558 |
| | | | | 718/1 |
| 2014/0304756 | A1* | 10/2014 | Fletcher | H04L 65/1066 |
| | | | | 725/115 |
| 2015/0058286 | A1* | 2/2015 | Leibovici | G06F 16/178 |
| | | | | 707/610 |
| 2015/0058837 | A1* | 2/2015 | Govindankutty | G06F 9/45533 |
| | | | | 718/1 |
| 2015/0172115 | A1* | 6/2015 | Nguyen | H04L 67/10 |
| | | | | 709/226 |
| 2015/0180980 | A1* | 6/2015 | Welinder | H04L 67/06 |
| | | | | 715/758 |
| 2015/0248315 | A1* | 9/2015 | Ragupathi | H04L 41/0806 |
| | | | | 709/226 |
| 2015/0350156 | A1* | 12/2015 | Ma | H04L 43/00 |
| | | | | 709/245 |
| 2016/0041837 | A1* | 2/2016 | Rangayya | G06F 9/45558 |
| | | | | 718/1 |
| 2016/0072687 | A1* | 3/2016 | Nakajima | G06F 11/3006 |
| | | | | 709/224 |

(56) References Cited

U.S. PATENT DOCUMENTS

| | | | | |
|---|---|---|---|---|
| 2016/0142482 A1* | 5/2016 | Mehta | ...................... | H04L 67/42 |
| | | | | 709/203 |
| 2016/0173226 A1* | 6/2016 | Choi | ....................... | H04L 5/001 |
| | | | | 455/1 |
| 2016/0218991 A1* | 7/2016 | Sharabi | ............... | G06F 9/45558 |
| 2016/0224479 A1* | 8/2016 | Shigeta | .................... | G06F 3/06 |
| 2016/0226950 A1* | 8/2016 | Goel | ...................... | H04L 67/06 |
| 2016/0227029 A1* | 8/2016 | Wolfeld | ................. | H04M 3/12 |

FOREIGN PATENT DOCUMENTS

| | | |
|---|---|---|
| CN | 104811473 A | 7/2015 |
| WO | 2012145541 A2 | 10/2012 |

OTHER PUBLICATIONS

Shigeta et al., "Computer system, and computer system control method", US Pub 20160224479A1, 2013 (Year: 2013).*
Merriam-Webster, "nonvolatile", 2019 (Year: 2019).*
Merriam-Webster, "virtual", 2019 (Year: 2019).*
Microsoft Computer Dictionary, "virtual", 5th edition, 2002, p. 553 (Year: 2002).*
Wikipedia, "Non-volatile memory", 2019 (Year: 2019).*
Dictionary, "correspond", 2020 (Year: 2020).*
Dowling, "Database Design & Management", 1998 (Year: 1998).*
Gartner, "Best Practices in User ID Formation", 2003 (Year: 2003).*
IoT Agenda, "Unique Identifier (UID)", 2020 (Year: 2020).*
Microsoft, "DUIDs", 2020 (Year: 2020).*
NowSecure, "UUID", 2020 (Year: 2020).*
Wikipedia, "Unique Identifier", 2020 (Year: 2020).*

* cited by examiner

METHOD AND SYSTEM FOR CREATING VIRTUAL NON-VOLATILE STORAGE MEDIUM, AND MANAGEMENT SYSTEM

CROSS-REFERENCE TO RELATED APPLICATIONS

This application is a continuation of International Application No. PCT/CN2016/075959, filed on Mar. 9, 2016, which claims priority to Chinese Patent Application No. 201510120673.5, filed on Mar. 18, 2015. The disclosures of the aforementioned applications are hereby incorporated by reference in their entireties.

TECHNICAL FIELD

The present disclosure relates to the field of computer technologies, and in particular, to a method and a system for creating a virtual non-volatile storage medium, and a management system.

BACKGROUND

With the development of network technologies, to ensure that multiple remote systems can access one storage medium simultaneously, a solution of a virtual storage medium is developed. Currently, a dominant virtual storage medium is a virtual CD-ROM drive. A virtual CD-ROM drive can implement all that can be implemented by a general CD-ROM drive. FIG. 1 shows an implementation architecture of a virtual CD-ROM drive. This architecture mainly includes a client, an external network, an external switch, and blade servers. In this architecture, a CD-ROM drive in the client can be virtualized.

A CD-ROM drive is used to read content in a compact disc. However, with the development of technologies, compact discs are being used rarely but replaced by other storage media such as USB flash drives and removable hard disks. Therefore, it is urgent to provide virtual USB flash drives, virtual removable hard disks, and the like. At present, however, there is no method available for creating a virtual USB flash drive or a virtual removable hard disk. As a result, a non-volatile storage medium such as a USB flash drive or a removable hard disk can be accessed by only one blade server at a time, and multiple blade servers cannot access one non-volatile storage medium such as a USB flash drive or a removable hard disk simultaneously. This has led to a defect of low access efficiency.

SUMMARY

Embodiments of the present disclosure provide a method and system for creating a virtual non-volatile storage medium, and a management system, so as to resolve a prior-art defect that access efficiency is low because multiple blade servers cannot access one non-volatile storage medium such as a USB flash drive or a removable hard disk simultaneously.

According to a first aspect, a method for creating a virtual non-volatile storage medium is provided, and applied to a system for creating a virtual non-volatile storage medium. The system for creating a virtual non-volatile storage medium includes multiple blade servers, a client, and a management device. The management device includes a central processing unit (CPU) and a local area network switch (LSW), and Ethernet interfaces are used to connect the blade servers and the management device and connect the client and the management device. The method includes: receiving, by the CPU, a creation request message that is sent by the client and that is for creating a virtual non-volatile storage medium corresponding to a physical non-volatile storage medium, where the creation request message carries a blade server identifier. The method also includes forwarding, by the CPU, the creation request message to a target blade server identified by the blade server identifier. The method also includes receiving, by the CPU, attribute information sent by the target blade server, and sending the attribute information to the client, such that the client creates, according to the attribute information, a virtual non-volatile storage medium that can be uniquely accessed by the target blade server.

With reference to the first aspect, in a first possible implementation manner, before the receiving, by the CPU, a creation request message that is sent by the client and that is for creating a virtual non-volatile storage medium corresponding to a physical non-volatile storage medium, the method further includes: receiving, by the CPU, a first link establishment request that the client sends after establishing a management link with the CPU, where the first link establishment request is used to establish a management link between the CPU and the target blade server; forwarding, by the CPU, the first link establishment request to the target blade server; and receiving, by the CPU, a management link success response message returned by the target blade server, to complete establishment of the management link between the CPU and the target blade server.

With reference to the first possible implementation manner of the first aspect, in a second possible implementation manner, after the receiving, by the CPU, a management link success response message returned by the target blade server, the method further includes: receiving, by the CPU, a second link establishment request sent by the client, where the second link establishment request is used to establish a data link between the client and the target blade server; receiving, by the CPU, a data link success response message returned by the target blade server, where the data link success response message carries a port number of the to-be-established data link; obtaining, by the CPU, an Internet Protocol (IP) address of the target blade server; generating, by the CPU, an entry according to the port number and the IP address, where the entry includes a mapping relationship between the port number and the IP address; and sending, by the CPU, the entry to the LSW, to complete establishment of the data link between the client and the target blade server.

With reference to the second possible implementation manner of the first aspect, in a third possible implementation manner, after the sending, by the CPU, the entry to the LSW, the method further includes: receiving, by the LSW, a data packet that is sent by the client and that carries the IP address of the target blade server; determining, by the LSW according to the entry, the port number corresponding to the IP address; and sending, by the LSW, the received data packet to the target blade server by using the data link that uses the port number.

With reference to the third possible implementation manner of the first aspect, in a fourth possible implementation manner, after the sending, by the CPU, the entry to the LSW, the method further includes: increasing, for any data link of multiple data links between the client and the multiple blade servers, bandwidth of the any data link when the LSW determines that the any data link has reached a preset condition.

With reference to the fourth possible implementation manner of the first aspect, in a fifth possible implementation manner, the determining, by the LSW, that the any data link has reached a preset condition further includes: determining, by the LSW, that a packet loss rate of the any data link has reached a preset packet loss rate threshold; or determining, by the LSW, that a ratio of a current specified rate of the any data link to average traffic that is within a preset time has not reached a preset ratio threshold.

With reference to the fourth or fifth possible implementation manner of the first aspect, in a sixth possible implementation manner, the method further includes: decreasing the bandwidth of the any data link when the LSW determines that the any data link has not reached the preset condition.

With reference to any one of the fourth to the sixth possible implementation manners of the first aspect, in a seventh possible implementation manner, the increasing, by the LSW, bandwidth of the any data link further includes: using, by the LSW, bandwidth of a data link on which a count of 0 rates within a preset time has reached a preset count to compensate the any data link; or selecting, by the LSW, a data link with the largest bandwidth margin from data links that have never reached the preset condition, and using bandwidth of the selected data link to compensate the any data link.

With reference to any one of the first aspect, or the first to the seventh possible implementation manners of the first aspect, in an eighth possible implementation manner, the attribute information includes size information and/or volume label information of storage space of the to-be-created virtual non-volatile storage medium, and the volume label information is used to identify that the to-be-created virtual non-volatile storage medium can be uniquely accessed by the target blade server.

According to a second aspect, a management system is provided. The management system includes a central processing unit (CPU) and a local area network switch (LSW). The CPU includes a first receiving unit and a first sending unit. The LSW includes a second receiving unit, a determining unit, and a second sending unit, where the first receiving unit is configured to receive a creation request message that is sent by the client and that is for creating a virtual non-volatile storage medium corresponding to a physical non-volatile storage medium, where the creation request message carries a blade server identifier. The first sending unit is configured to forward the creation request message received by the first receiving unit to a target blade server identified by the blade server identifier. The first receiving unit is further configured to receive attribute information sent by the target blade server. The first sending unit is further configured to send the attribute information received by the first receiving unit to the client, such that the client creates, according to the attribute information, a virtual non-volatile storage medium that can be uniquely accessed by the target blade server.

According to the second aspect, in a first possible implementation manner, the first receiving unit is further configured to: receive a first link establishment request that the client sends after establishing a management link with the CPU, where the first link establishment request is used to establish a management link between the CPU and the target blade server; the first sending unit is further configured to forward the first link establishment request received by the first receiving unit to the target blade server; and the first receiving unit is further configured to receive a management link success response message returned by the target blade server, to complete establishment of the management link between the CPU and the target blade server.

With reference to the first possible implementation manner of the second aspect, in a second possible implementation manner, the first receiving unit is further configured to: receive a second link establishment request sent by the client, where the second link establishment request is used to establish a data link between the client and the target blade server; receive a data link success response message returned by the target blade server, where the data link success response message carries a port number of the to-be-established data link; and obtain an Internet Protocol (IP) address of the target blade server; the CPU further includes a generation unit, where the generation unit is configured to generate an entry according to the port number received by the first receiving unit and the obtained IP address, and the entry includes a mapping relationship between the port number and the IP address; and the first sending unit is configured to send the entry generated by the generation unit to the second receiving unit, to complete establishment of the data link between the client and the target blade server.

With reference to the second possible implementation manner of the second aspect, in a third possible implementation manner, the second receiving unit is further configured to receive a data packet that is sent by the client and that carries the IP address of the target blade server; the determining unit is configured to determine, according to the entry that is sent by the first sending unit and received by the second receiving unit, the port number corresponding to the IP address; and the second sending unit is configured to send the data packet received by the second receiving unit to the target blade server by using the data link that uses the port number.

With reference to the third possible implementation manner of the second aspect, in a fourth possible implementation manner, the LSW further includes a traffic control unit, and the traffic control unit is configured to: increase, for any data link of multiple data links between the client and the multiple blade servers, bandwidth of the any data link to carry more traffic on the any data link when the determining unit determines that the any data link has reached a preset condition.

With reference to the fourth possible implementation manner of the second aspect, in a fifth possible implementation manner, the determining, by the determining unit, that the any data link has reached a preset condition is: determining that a packet loss rate of the any data link has reached a preset packet loss rate threshold; or determining that a ratio of a current specified rate of the any data link to average traffic that is within a preset time has not reached a preset ratio threshold.

With reference to the fourth or fifth possible implementation manner of the second aspect, in a sixth possible implementation manner, the traffic control unit is further configured to: decrease the bandwidth of the any data link and reduce traffic of the any data link when the determining unit determines that the any data link has not reached the preset condition.

With reference to any one of the fourth to the sixth possible implementation manners of the second aspect, in a seventh possible implementation manner, the increasing, by the traffic control unit, bandwidth of the any data link is: using bandwidth of a data link that has not reached the preset condition to compensate the any data link.

With reference to any one of the second aspect, or the first to the seventh possible implementation manners of the second aspect, in an eighth possible implementation manner, the attribute information includes size information and/or volume label information of storage space of the to-be-created virtual non-volatile storage medium, and the volume label information is used to identify that the to-be-created virtual non-volatile storage medium can be uniquely accessed by the target blade server.

According to a third aspect, a system for creating a virtual non-volatile storage medium is provided. The system for creating a virtual non-volatile storage medium includes multiple blade servers, a client, and a management device. The management device includes a central processing unit CPU and a local area network switch LSW. Ethernet interfaces are used to connect the blade servers and the management device and connect the client and the management device. The CPU includes a first receiving unit and a first sending unit. The LSW includes a second receiving unit, a determining unit, and a second sending unit. The first receiving unit is configured to receive a creation request message that is sent by the client and that is for creating a virtual non-volatile storage medium corresponding to a physical non-volatile storage medium, where the creation request message carries a blade server identifier. The first sending unit is configured to forward the creation request message received by the first receiving unit to a target blade server identified by the blade server identifier. The first receiving unit is further configured to receive attribute information sent by the target blade server. The first sending unit is further configured to send the attribute information received by the first receiving unit to the client, such that the client creates, according to the attribute information, a virtual non-volatile storage medium that can be uniquely accessed by the target blade server.

The embodiments of the present disclosure provide a method for creating a virtual non-volatile storage medium. The method is applied to a system for creating a virtual non-volatile storage medium. The system for creating a virtual non-volatile storage medium includes multiple blade servers, a client, and a management device, the management device includes a central processing unit (CPU) and an local area network (LAN) switch (LSW), and Ethernet interfaces are used to connect the blade servers and the management device and connect the client and the management device. The method includes: receiving, by the CPU, a creation request message that is sent by the client and that is for creating a virtual non-volatile storage medium corresponding to a physical non-volatile storage medium, where the creation request message carries a blade server identifier. The method also includes forwarding, by the CPU, the creation request message to a target blade server identified by the blade server identifier. The method also includes receiving, by the CPU, attribute information sent by the target blade server, and sending the attribute information to the client, such that the client creates, according to the attribute information, a virtual non-volatile storage medium that can be uniquely accessed by the target blade server. The solution provides a solution for creating a virtual non-volatile storage medium and can be applied to creating a virtual USB flash drive or a virtual removable hard disk. After a virtual non-volatile storage medium is created, a blade server can access the virtual non-volatile storage medium created for the blade server, to access a physical non-volatile storage medium. In this way, multiple blade servers can access one non-volatile storage medium such as a virtual USB flash drive or a removable hard disk simultaneously. This further improves access efficiency and overcomes the prior-art defect.

DETAILED DESCRIPTION OF ILLUSTRATIVE EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the following, implementation manners of the present disclosure are described in detail with reference to the accompanying drawings of the specification. It should be understood that the embodiments described herein are only used to describe and explain the present disclosure, but are not intended to limit the present disclosure. In addition, the embodiments of the present application and features in the embodiments may be combined when they do not conflict with each other.

The following describes the implementation manners of the present disclosure in detail with reference to the accompanying drawings.

Figure 1:
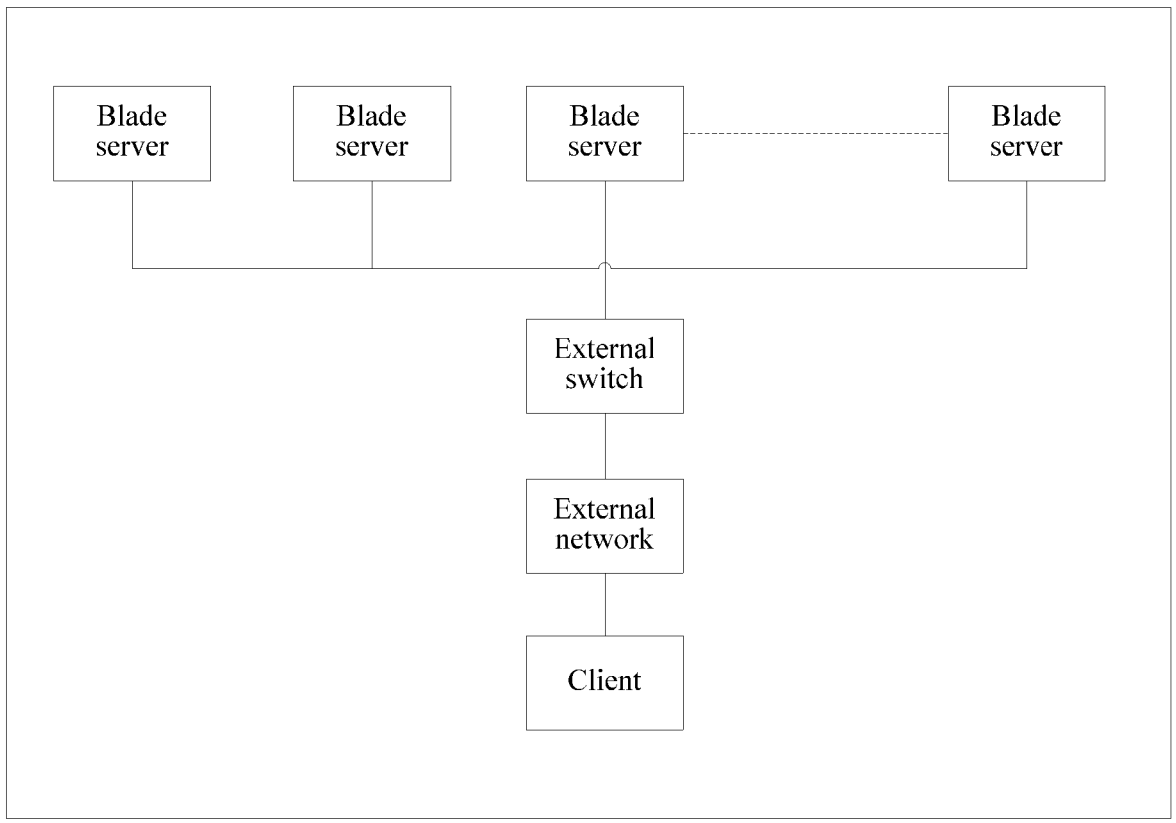
FIG. 1 is a schematic diagram of creating a virtual CD-ROM drive in the prior art.
Figure 2A:
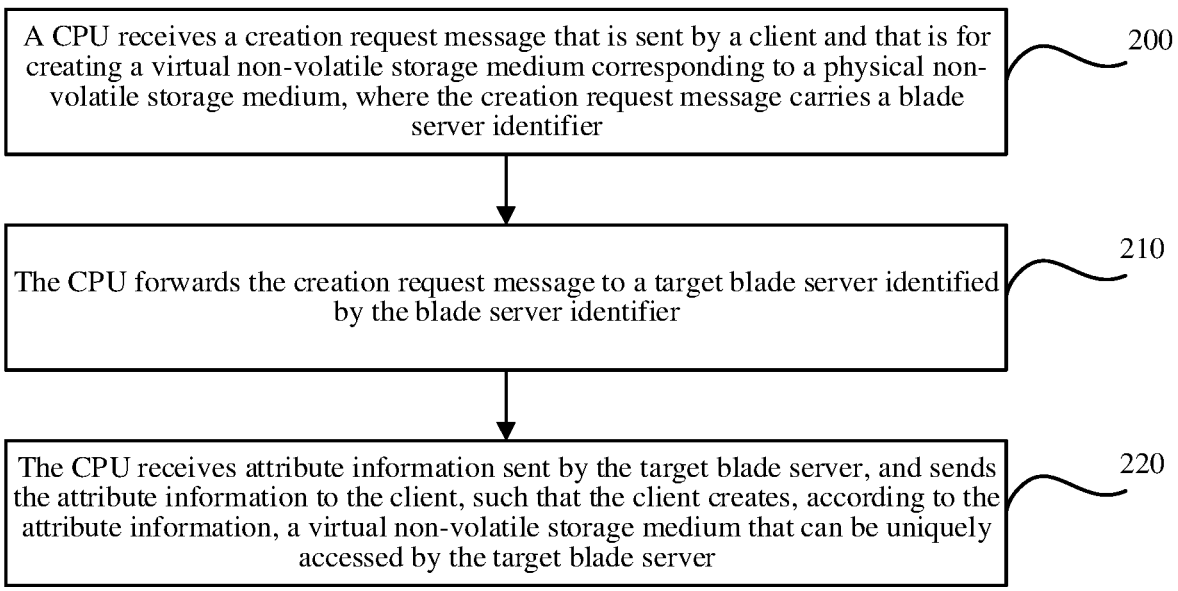
FIG. 2A is a flowchart of creating a non-volatile storage medium according to an embodiment of the present disclosure.
Figure 2B:
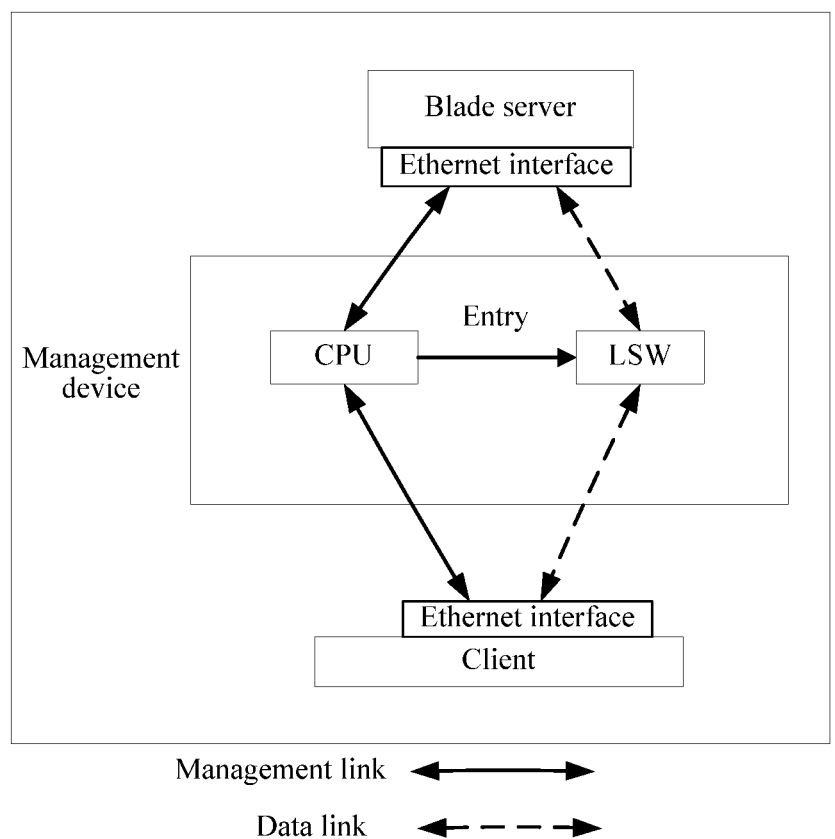
FIG. 2B is a scenario diagram of creating a non-volatile storage medium according to an embodiment of the present disclosure.

Referring to FIG. 2A, in this embodiment of the present disclosure, a method for creating a virtual non-volatile storage medium is provided. The method is applied to a system for creating a virtual non-volatile storage medium. As shown in FIG. 2B, the system for creating a virtual non-volatile storage medium includes multiple blade servers, a client, and a management device, the management device includes a CPU and an LSW, and Ethernet interface are used to connect the blade servers and the management device and connect the client and the management device. A detailed process of the method is as follows.

Step 200: The CPU receives a creation request message that is sent by the client and that is for creating a virtual non-volatile storage medium corresponding to a physical non-volatile storage medium, where the creation request message carries a blade server identifier.

In this embodiment of the present disclosure, the client may be in multiple forms. Optionally, the client refers to a client on which virtual machine manager (VMM) software is installed. The client may alternatively be another form of client though, and details are not further described herein.

In this embodiment of the present disclosure, the physical non-volatile storage medium refers to a non-volatile storage medium connected to the client. Optionally, the physical non-volatile storage medium may be connected to the client by using a universal serial bus (USB), or may be connected to the client in another manner, and details are not further described herein.

Step 210: The CPU forwards the creation request message to a target blade server identified by the blade server identifier.

In this embodiment of the present disclosure, the client can create a virtual non-volatile storage medium for a blade server provided that VMM software is also installed on a board management controller (BMC) of the server.

Step 220: The CPU receives attribute information sent by the target blade server, and sends the attribute information to the client, such that the client creates, according to the attribute information, a virtual non-volatile storage medium that can be uniquely accessed by the target blade server.

In this embodiment of the present disclosure, for any blade server, a virtual non-volatile storage medium that is created for the any blade server and that corresponds to the physical non-volatile storage medium can be accessed only by the any blade server, and cannot be accessed by any other blade server.

For example, there is a blade server A and a blade server B. A virtual USB flash drive that is created for the blade server A and that corresponds to a USB flash drive is a virtual USB flash drive 1, and a virtual USB flash drive that is created for the blade server B and that corresponds to the USB flash drive is a virtual USB flash drive 2. In this case, the virtual USB flash drive 1 can be accessed only by the blade server A, and the virtual USB flash drive 2 can be accessed only by the blade server B.

In this embodiment of the present disclosure, one blade server may correspond to multiple virtual USB flash drives, but one virtual USB flash drive can correspond to only one blade server.

For example, there is a USB flash drive 1 and a USB flash drive 2 in a client. In this case, for the blade server, a virtual USB flash drive corresponding to the USB flash drive 1 is a virtual USB flash drive 1, and a virtual USB flash drive corresponding to the USB flash drive 2 is a virtual USB flash drive 2.

In this embodiment of the present disclosure, to avoid creating multiple virtual non-volatile storage media for one blade server with respect to one non-volatile storage medium, before the client sends the creation request message to the CPU of the management device, the following operation is further included: determining, by the client, that no virtual non-volatile storage medium corresponding to the physical non-volatile storage medium has been created for the target blade server.

For example, three USB flash drives: a USB flash drive 1, a USB flash drive 2, and a USB flash drive 3, are inserted into the client; VMM software is installed on the client; and two blade servers: a blade server A and a blade server B, are installed with the VMM software. When creating, for the blade server A, a virtual USB flash drive corresponding to the USB flash drive 1, the client first needs to determine that no virtual USB flash drive corresponding to the USB flash drive 1 has been created for the blade server A. If a virtual USB flash drive corresponding to the USB flash drive 1 has been created for the blade server A, the client needs to send a creation request message. In this case, only that no virtual USB flash drive corresponding to the USB flash drive 1 has been created for the blade server A needs to be determined, and there is no need to determine whether a virtual USB flash drive corresponding to the USB flash drive 1 has been created for the blade server B, whether a virtual USB flash drive corresponding to the USB flash drive 2 has been created for the blade server B, or whether a virtual USB flash drive corresponding to the USB flash drive 3 has been created for the blade server B. Similarly, when creating, for the blade server A, a virtual USB flash drive corresponding to the USB flash drive 2, the client first needs to determine that no virtual USB flash drive corresponding to the USB flash drive 2 has been created for the blade server A. If a virtual USB flash drive corresponding to the USB flash drive 2 has been created for the blade server A, the client needs to send a creation request message. In this case, only that no virtual USB flash drive corresponding to the USB flash drive 2 has been created for the blade server A needs to be determined, and there is no need to determine whether a virtual USB flash drive corresponding to the USB flash drive 1 has been created for the blade server B, whether a virtual USB flash drive corresponding to the USB flash drive 2 has been created for the blade server B, or whether a virtual USB flash drive corresponding to the USB flash drive 3 has been created for the blade server B. Similarly, when creating, for the blade server A, a virtual USB flash drive corresponding to the USB flash drive 3, the client first needs to determine that no virtual USB flash drive corresponding to the USB flash drive 3 has been created for the blade server A. If a virtual USB flash drive corresponding to the USB flash drive 3 has been created for the blade server A, the client needs to send a creation request message. In this case, only that no virtual USB flash drive corresponding to the USB flash drive 3 has been created for the blade server A needs to be determined, and there is no need to determine whether a virtual USB flash drive corresponding to the USB flash drive 1 has been created for the blade server B, whether a virtual USB flash drive corresponding to the USB flash drive 2 has been created for the blade server B, or whether a virtual USB flash drive corresponding to the USB flash drive 3 has been created for the blade server B.

The foregoing describes only a process of creating virtual USB flash drives corresponding to all the USB flash drives for the blade server A. To create virtual USB flash drives corresponding to all the USB flash drives for the blade server B, the foregoing similar operations also need to be performed, and details are not further described herein.

The client interacts with the blade servers based on management links by using the management device. Therefore, in this embodiment of the present disclosure, before the CPU receives the creation request message that is sent by the client and that is for creating the virtual non-volatile storage medium corresponding to the physical non-volatile storage medium, the following operations are further included: receiving, by the CPU, a first link establishment request that the client sends after establishing a management link with the CPU, where the first link establishment request is used to establish a management link between the CPU and the target blade server; forwarding, by the CPU, the first link establishment request to the target blade server; and receiving, by the CPU, a management link success response message returned by the target blade server, to complete establishment of the management link between the CPU and the target blade server.

In this way, after a management link is established between the client and the CPU, and a management link is also established between the target blade server and the CPU, the client can send a creation request message to the target blade server by using the management links. In addition, it can be learnt from the foregoing that the management link between the client and the target blade server is implemented through forwarding by the CPU of the management device.

In application, a data packet is transmitted by using a data link. Therefore, a data link still needs to be established between the client and the target blade server. Therefore, in this embodiment of the present disclosure, after the CPU receives the management link success response message returned by the target blade server, the following operations are further included: receiving, by the CPU, a second link establishment request sent by the client, where the second link establishment request is used to establish a data link between the client and the target blade server; receiving, by the CPU, a data link success response message returned by the target blade server, where the data link success response message carries a port number of the to-be-established data link; obtaining, by the CPU, an Internet Protocol (IP) address of the target blade server; generating, by the CPU, an entry according to the port number and the IP address, where the entry includes a mapping relationship between the port number and the IP address; and sending, by the CPU, the entry to the LSW, to complete establishment of the data link between the client and the target blade server.

Because a data packet between the client and the target blade server is forwarded by using the LSW, in the foregoing process, the CPU needs to send the generated entry to the LSW. In this way, when the LSW receives the data packet, a corresponding data link can be found according to the entry, and the found data link is used to send the data packet to the target blade server. A further implementation process is as follows:

In this embodiment of the present disclosure, after the CPU sends the entry to the LSW, the following operations are further included: receiving, by the LSW, a data packet that is sent by the client and that carries the IP address of the target blade server; determining, by the LSW according to the entry, the port number corresponding to the IP address; and sending, by the LSW, the received data packet to the target blade server by using the data link that uses the port number.

For example, the port number that is of the to-be-established data link and that is carried by the data link success response message is a port number 1, and the IP address of the target blade server is an IP address A. In this case, the CPU of the management device generates an entry including a mapping relationship between the port number 1 and the IP address A and sends the generated entry to the LSW. After receiving a data packet that is sent by the client and that carries the IP address A, the LSW finds, from the entry, that a port number corresponding to the IP address A is the port number 1, and determines that the data link that uses the port number 1 is a data link 1. Then, the LSW sends the received data packet to the target blade server by using the data link 1.

In this embodiment of the present disclosure, after the CPU of the management device sends the attribute information to the client, the following operations are further included: receiving, by the CPU of the management device, an access request message that is sent by the target blade server and that is for accessing the virtual non-volatile storage medium; and sending, by the CPU of the management device, the received access request message to the client, such that the client operates the virtual non-volatile storage medium according to the access request message.

For example, the blade server 1 sends, by using the CPU of the management device, a command for querying a size of the virtual USB flash drive (the command includes a volume label of the virtual USB flash drive) to the client, and the client queries the size of the corresponding virtual USB flash drive according to the volume label of the virtual USB flash drive, and sends the size to the blade server 1 by using the CPU of the management device. Alternatively, the blade server 1 sends a root directory opening command to the client by using the CPU of the management device, and the client queries a root directory structure and sends the root directory structure to the blade server 1 by using the CPU of the management device. Alternatively, the blade server 1 sends a directory opening command to the client by using the CPU of the management device, and the client queries a directory structure and sends the root directory structure to the blade server 1 by using the CPU of the management device. Alternatively, the blade server 1 sends a file opening command to the client by using the CPU of the management device, and the client reads file content and sends the read file content to the blade server 1 by using the CPU of the management device. Alternatively, the blade server 1 sends a file write command (the command includes a file write location and content information) to the client by using the CPU of the management device, and the file is written into the client according to the command.

The foregoing describes how the client performs read and write operations on the virtual non-volatile storage medium. In application, the client may also format the virtual non-volatile storage medium. For example, when data in the virtual USB flash drive is unneeded or some data cannot be deleted, data in the virtual USB flash drive can be cleared by means of formatting.

In this embodiment of the present disclosure, because a data packet between the client and each blade server is forwarded by using the LSW of the management device, the LSW can control traffic. A further implementation process is as follows:

After the CPU sends the entry to the LSW, the following operation is further included: increasing, for any data link of multiple data links between the client and the multiple blade servers, bandwidth of the any data link when the LSW determines that the any data link has reached a preset condition.

For example, there are 10 blade servers, with one data link between the client and each blade server. Therefore, there are 10 data links: a data link 1, a data link 2, a data link 3, . . . , and a data link 10. For the data link 1, if the data link 1 has reached a preset condition, bandwidth of the data link 1 is increased to carry more traffic on the data link 1. For the data link 2, if the data link 2 has reached the preset condition, bandwidth of the data link 2 is increased to carry more traffic on the data link 2. Traffic control processes for the rest data links are the same as the processes for the data link 1 and the data link 2, and are not detailed one by one herein.

In this embodiment of the present disclosure, the LSW may determine, in multiple ways, that the any data link has reached the preset condition. Optionally, the following way may be used.

The LSW determines that a packet loss rate of the any data link has reached a preset packet loss rate threshold, which indicates a relatively small bandwidth margin of the any data link. Therefore, the bandwidth of the any data link needs to be increased to carry more traffic on the any data link.

Alternatively, the LSW determines that a ratio of a current specified rate of the any data link to average traffic that is within a preset time has not reached a preset ratio threshold, which may also indicate a relatively small bandwidth margin of the any data link. Therefore, the bandwidth of the any data link needs to be increased to carry more traffic on the any data link.

Certainly, in application, the LSW may determine, in another way, that the any data link has reached the preset condition, and details are not further described herein.

The foregoing describes that bandwidth of any data link needs to be increased when the LSW determines that this data link has reached a preset condition. In application, a data link may have not reached the preset condition though. In this case, bandwidth of the data link needs to be decreased to reduce traffic on the data link.

In this embodiment of the present disclosure, the LSW may increase the bandwidth of the any data link in multiple ways. Optionally, the following way may be used.

The LSW uses bandwidth of a data link that has not reached the preset condition to compensate the any data link.

For example, the LSW uses bandwidth of a data link on which a count of 0 rates within a preset time has reached a preset count to compensate the any data link; or the LSW selects a data link with the largest bandwidth margin from data links that have never reached the preset condition, and uses bandwidth of the selected data link to compensate the any data link.

In this embodiment of the present disclosure, optionally, the attribute information includes size information and/or volume label information of storage space of the to-be-created virtual non-volatile storage medium, where the volume label information is used to identify that the to-be-created virtual non-volatile storage medium can be uniquely accessed by the target blade server.

In this embodiment of the present disclosure, the client and the blade server send heartbeat information regularly to prove that the data link is normal. This heartbeat information is also transferred to the management device. If the management device receives no heartbeat information within a specified period of time, the management device disconnects the management link and the data link, and alerts about an exception.

To improve security, in this embodiment of the present disclosure, before the CPU receives the second link establishment request sent by the client, the following is further included: receiving, by the management device, an authentication key sent by the client; and returning, by the management device, authentication success information to the client after authentication based on the authentication key is successful.

Figure 3:
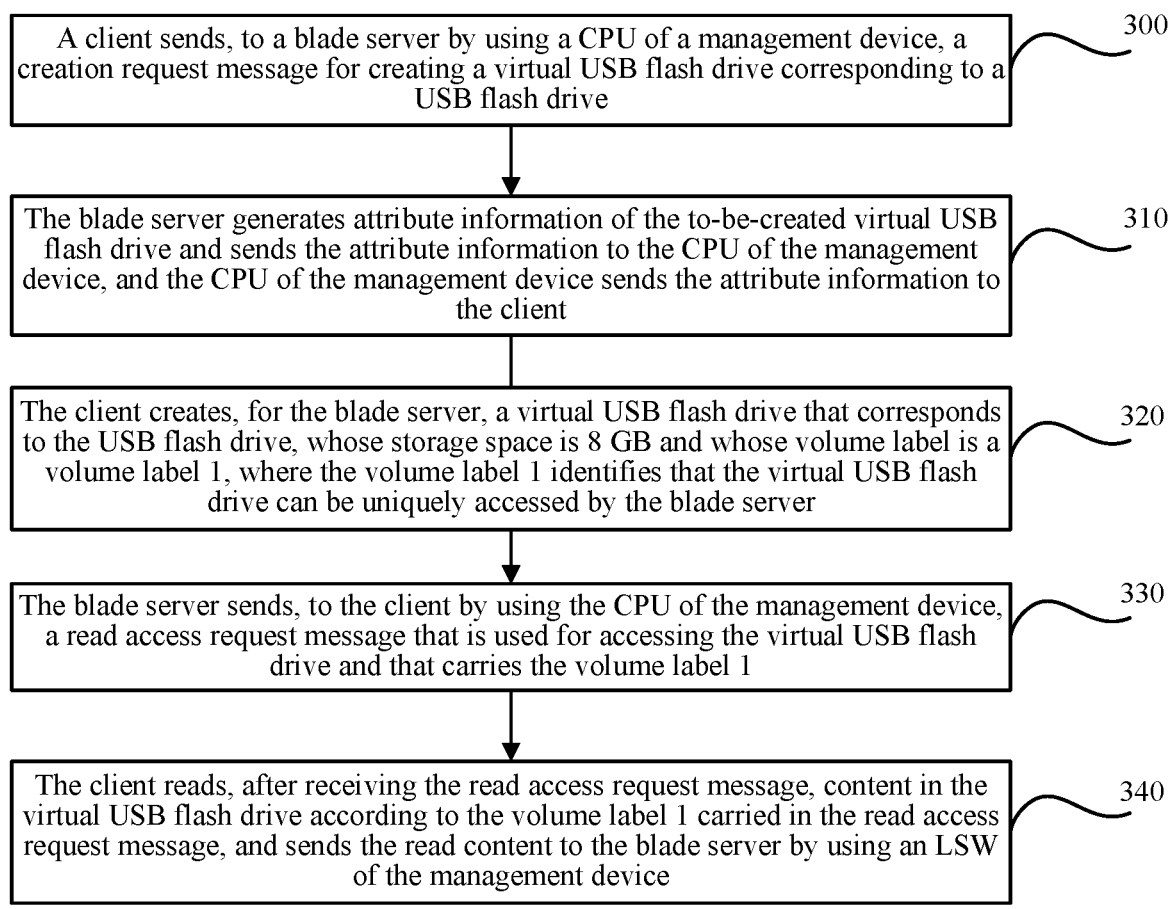
FIG. 3 is a schematic diagram of creating a non-volatile storage medium according to an embodiment of the present disclosure.

As shown in FIG. 3, to help better understand the embodiment of the present disclosure, the following provides a further application scenario and further describes in detail the process of creating a virtual USB flash drive.

Step 300: A client sends, to a blade server by using a CPU of a management device, a creation request message for creating a virtual USB flash drive corresponding to a USB flash drive.

Step 310: The blade server generates attribute information of the to-be-created virtual USB flash drive and sends the attribute information to the CPU of the management device, and the CPU of the management device sends the attribute information to the client.

The attribute information in this step includes a storage space size 8 GB and a volume label 1 of the to-be-created virtual USB flash drive.

Step 320: The client creates, for the blade server, a virtual USB flash drive that corresponds to the USB flash drive, whose storage space is 8 GB, and whose volume label is a volume label 1, where the volume label 1 identifies that the virtual USB flash drive can be uniquely accessed by the blade server.

Step 330: The blade server sends, to the client by using the CPU of the management device, a read access request message that is used for accessing the virtual USB flash drive and that carries the volume label 1.

Step 340: The client reads, after receiving the read access request message, content in the virtual USB flash drive according to the volume label 1 carried in the read access request message, and sends the read content to the blade server by using an LSW of the management device.

Figure 4:
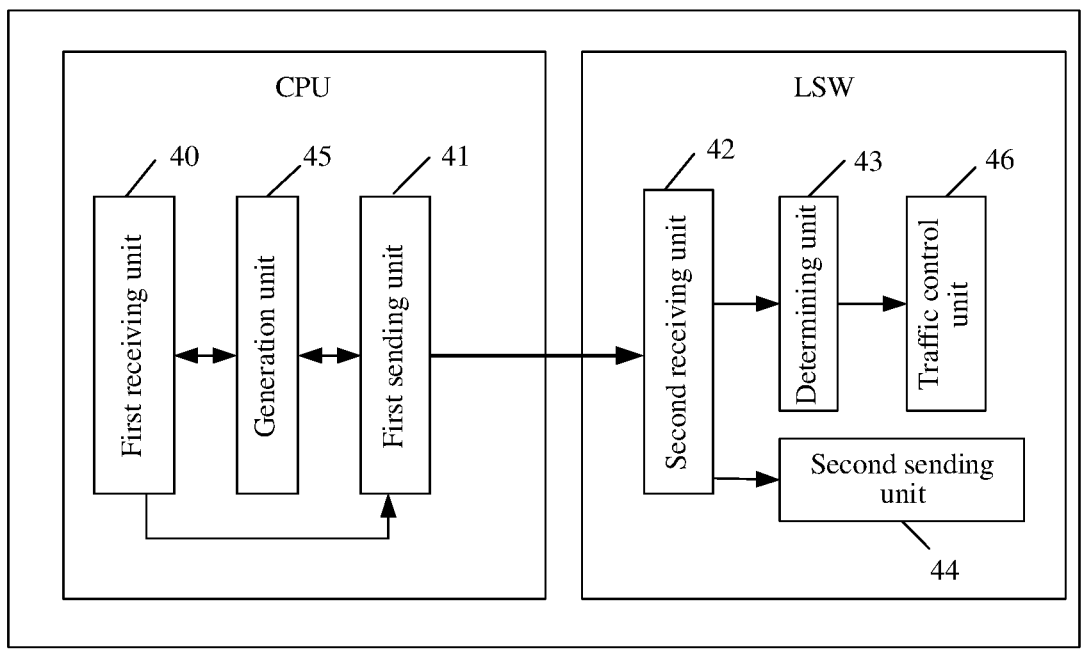
FIG. 4 is a schematic structural diagram of a management system according to an embodiment of the present disclosure.

Based on the technical solution of the foregoing corresponding method, referring to FIG. 4, an embodiment of the present disclosure provides a management device. The management device includes a CPU and an LSW. The CPU includes a first receiving unit 40 and a first sending unit 41. The LSW includes a second receiving unit 42, a determining unit 43, and a second sending unit 44.

The first receiving unit 40 is configured to receive a creation request message that is sent by the client and that is for creating a virtual non-volatile storage medium corresponding to a physical non-volatile storage medium, where the creation request message carries a blade server identifier.

The first sending unit 41 is configured to forward the creation request message received by the first receiving unit 40 to a target blade server identified by the blade server identifier.

The first receiving unit 40 is further configured to receive attribute information sent by the target blade server.

The first sending unit 41 is further configured to send the attribute information received by the first receiving unit 40 to the client, such that the client creates, according to the attribute information, a virtual non-volatile storage medium that can be uniquely accessed by the target blade server.

Further, in this embodiment of the present disclosure, the first receiving unit 40 is further configured to: receive a first link establishment request that the client sends after establishing a management link with the CPU, where the first link establishment request is used to establish a management link between the CPU and the target blade server.

The first sending unit 41 is further configured to forward the first link establishment request received by the first receiving unit 40 to the target blade server.

The first receiving unit 40 is further configured to receive a management link success response message returned by the target blade server, to complete establishment of the management link between the CPU and the target blade server.

Further, in this embodiment of the present disclosure, the first receiving unit 40 is further configured to: receive a second link establishment request sent by the client, where the second link establishment request is used to establish a data link between the client and the target blade server; receive a data link success response message returned by the target blade server, where the data link success response message carries a port number of the to-be-established data link; and obtain an IP address of the target blade server.

The CPU further includes a generation unit 45. The generation unit 45 is configured to generate an entry according to the port number received by the first receiving unit 40 and the IP address obtained by first receiving unit 40. The entry includes a mapping relationship between the port number and the IP address.

The first sending unit 41 is further configured to send the entry generated by the generation unit 45 to the second receiving unit 42, to complete establishment of the data link between the client and the target blade server.

Optionally, in this embodiment of the present disclosure, the second receiving unit 42 is further configured to receive a data packet that is sent by the client and that carries the IP address of the target blade server.

The determining unit 43 is configured to determine, according to the entry that is sent by the first sending unit 41 and received by the second receiving unit 42, the port number corresponding to the IP address.

The second sending unit 44 is configured to send the data packet received by the second receiving unit 42 to the target blade server by using the data link that uses the port number.

Further, in this embodiment of the present disclosure, the LSW includes a traffic control unit 46, and the traffic control unit 46 is configured to: increase, for any data link of multiple data links between the client and the multiple blade servers, bandwidth of the any data link when the determining unit 43 determines that the any data link has reached a preset condition.

Optionally, in this embodiment of the present disclosure, the determining, by the determining unit 43, that the any data link has reached a preset condition is determining that a packet loss rate of the any data link has reached a preset packet loss rate threshold; or determining that a ratio of a current specified rate of the any data link to average traffic that is within a preset time has not reached a preset ratio threshold.

Further, in this embodiment of the present disclosure, the traffic control unit 46 is further configured to: decrease the bandwidth of the any data link when the determining unit 43 determines that the any data link has not reached the preset condition.

Optionally, in this embodiment of the present disclosure, the increasing, by the traffic control unit 46, bandwidth of the any data link is: using bandwidth of a data link that has not reached the preset condition to compensate the any data link.

Optionally, in this embodiment of the present disclosure, the attribute information includes size information and/or volume label information of storage space of the to-be-created virtual non-volatile storage medium, where the volume label information is used to identify that the to-be-created virtual non-volatile storage medium can be uniquely accessed by the target blade server.

Figure 5:
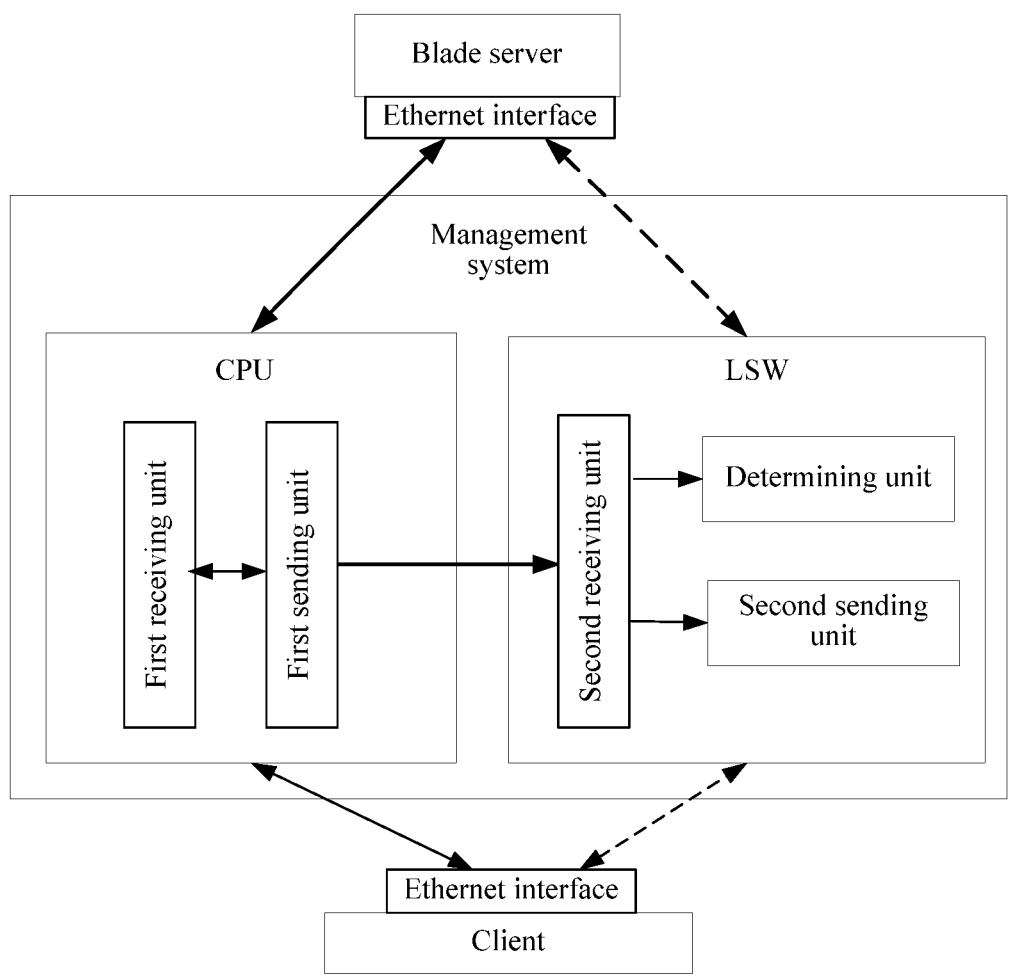
FIG. 5 is a schematic structural diagram of a system for creating a virtual non-volatile storage medium according to an embodiment of the present disclosure.

Based on the technical solution of the foregoing corresponding method, referring to FIG. 5, an embodiment of the present disclosure further provides a system for creating a virtual non-volatile storage medium. The system includes multiple blade servers, a client, and a management device. The management device includes a CPU and an LSW. Ethernet interfaces are used to connect the blade servers and the management device and connect the client and the management device. The CPU includes a first receiving unit and a first sending unit, and the LSW includes a second receiving unit, a determining unit, and a second sending unit.

The first receiving unit is configured to receive a creation request message that is sent by the client and that is for creating a virtual non-volatile storage medium corresponding to a physical non-volatile storage medium, where the creation request message carries a blade server identifier.

The first sending unit is configured to forward the creation request message received by the first receiving unit to a target blade server identified by the blade server identifier.

The first receiving unit is further configured to receive attribute information sent by the target blade server.

The first sending unit is further configured to send the attribute information received by the first receiving unit to the client, such that the client creates, according to the attribute information, a virtual non-volatile storage medium that can be uniquely accessed by the target blade server.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, such that the instructions executed by the computer or the processor of the another programmable data processing device generate an apparatus for implementing a further function in one or more processes in the flowcharts and/or in one or more blocks in the block diagrams.

These computer program instructions may alternatively be stored in a computer readable memory that can instruct a computer or another programmable data processing device to work in a specific manner, such that the instructions stored in the computer readable memory generate an artifact that includes an instruction apparatus. The instruction apparatus implements functions in one or more processes in the flowcharts and/or in one or more blocks in the block diagrams.

These computer program instructions may alternatively be loaded onto a computer or another programmable data processing device, such that a series of operation steps are performed on the computer or the another programmable device to generate computer-implemented processing. Therefore, the instructions executed on the computer or the another programmable device provide steps for implementing steps of functions in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed to cover the embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the claims and their equivalent technologies.

What is claimed is:

1. A method, comprises:
   receiving, by a central processing unit (CPU), a creation request message that is sent by a client having an associated physical non-volatile storage medium, the creation request message requesting creation of a virtual non-volatile storage medium at the client corresponding to the physical non-volatile storage medium, and the virtual non-volatile storage medium being created for a target blade server in a plurality of blade servers such that the virtual non-volatile storage medium is uniquely accessible to the target blade server, wherein the creation request message carries a blade server identifier identifying the target blade server, wherein the CPU is comprised in a management device in a system, wherein the system comprises the plurality of blade servers, the client, and the management device, the management device further comprises a local area network switch (LSW), and Ethernet interfaces are used to connect the plurality of blade servers and the management device and to connect the client and the management device;

forwarding, by the CPU, the creation request message to the target blade server identified by the blade server identifier; and receiving, by the CPU, attribute information sent by the target blade server, and sending, by the CPU, the attribute information to the client, so that the client creates, according to the attribute information, the virtual non-volatile storage medium.

2. The method according to claim 1, wherein before receiving the creation request message, the method further comprises:

receiving, by the CPU, a first link establishment request that the client sends after establishing a management link with the CPU, wherein the first link establishment request is used to establish a management link between the CPU and the target blade server;

forwarding, by the CPU, the first link establishment request to the target blade server; and receiving, by the CPU, a management link success response message returned by the target blade server, to complete establishment of the management link between the CPU and the target blade server.

3. The method according to claim 2, wherein after receiving the management link success response message returned by the target blade server, the method further comprises:

receiving, by the CPU, a second link establishment request sent by the client, wherein the second link establishment request is used to establish a data link between the client and the target blade server;

receiving, by the CPU, a data link success response message returned by the target blade server, wherein the data link success response message carries a port number of the to-be-established data link;

obtaining, by the CPU, an Internet Protocol (IP) address of the target blade server;

generating, by the CPU, an entry according to the port number and the IP address, wherein the entry comprises a mapping relationship between the port number and the IP address; and sending, by the CPU, the entry to the LSW, to complete establishment of the data link between the client and the target blade server.

4. The method according to claim 3, wherein after sending the entry to the LSW, the method further comprises:

receiving, by the LSW, a data packet that is sent by the client and that carries the IP address of the target blade server;

determining, by the LSW according to the entry, the port number corresponding to the IP address; and sending, by the LSW, the received data packet to the target blade server by using the data link that uses the port number.

5. The method according to claim 4, wherein after sending the entry to the LSW, the method further comprises:

increasing, for a first data link of a plurality of data links between the client and the plurality of blade servers, bandwidth of the first data link when the LSW determines that the first data link has reached a preset condition.

6. The method according to claim 5, wherein determining that the first data link has reached a preset condition further comprises:

determining, by the LSW, that a packet loss rate of the first data link has reached a preset packet loss rate threshold; or determining, by the LSW, that a ratio of a current specified rate of the first data link to average traffic that is within a preset time has not reached a preset ratio threshold.

7. The method according to claim 5, further comprising:

decreasing the bandwidth of the first data link when the LSW determines that the first data link has not reached the preset condition.

8. The method according to claim 5, wherein increasing the bandwidth of the first data link further comprises:

using, by the LSW, bandwidth of a second data link on which a count of o rates within a preset time has reached a preset count to compensate the first data link; or selecting, by the LSW, a third data link with the largest bandwidth margin from data links that have never reached the preset condition, and using bandwidth of the selected third data link to compensate the first data link.

9. The method according to claim 1, wherein the attribute information comprises size information and/or volume label information of storage space of the to-be-created virtual non-volatile storage medium, and the volume label information identifies that the to-be-created virtual non-volatile storage medium can be uniquely accessed by the target blade server.

10. A management system, comprising:

a central processing unit (CPU); and a local area network switch (LSW);

wherein the CPU is configured to:

receive a creation request message that is sent by a client having a connected physical non-volatile storage medium, the creation request message requesting creation of a virtual non-volatile storage medium at the client corresponding to the physical non-volatile storage medium, and the virtual non-volatile storage medium being created for a target blade server in a plurality of blade servers such that the virtual non-volatile storage medium is uniquely accessible to the target blade server, wherein the creation request message carries a blade server identifier identifying the target blade server;

forward the creation request message to the target blade server identified by the blade server identifier;

receive attribute information sent by the target blade server; and send the attribute information to the client, such that the client creates, according to the attribute information, the virtual non-volatile storage medium.

11. The management system according to claim 10, wherein the CPU is further configured to:
receive a first link establishment request that the client sends after establishing a management link with the CPU, wherein the first link establishment request is used to establish a management link between the CPU and the target blade server;
forward the first link establishment request to the target blade server; and
receive a management link success response message returned by the target blade server, to complete establishment of the management link between the CPU and the target blade server.

12. The management system according to claim 11, wherein the CPU is further configured to:
receive a second link establishment request sent by the client, wherein the second link establishment request is used to establish a data link between the client and the target blade server;
receive a data link success response message returned by the target blade server, wherein the data link success response message carries a port number of the to-be-established data link; and
obtain an Internet Protocol (IP) address of the target blade server;
generate an entry according to the port number and the obtained IP address, and the entry comprises a mapping relationship between the port number and the IP address; and
send the entry to the LSW, to complete establishment of the data link between the client and the target blade server.

13. The management system according to claim 12, wherein the LSW is further configured to:
receive a data packet that is sent by the client and that carries the IP address of the target blade server;
determine, according to the entry that is sent by the CPU, the port number corresponding to the IP address; and
send the data packet to the target blade server using the data link that uses the port number.

14. The management system according to claim 13, wherein the LSW is further configured to:
increase, for a first data link of a plurality of data links between the client and the plurality of blade servers, bandwidth of the first data link when determining that the first data link has reached a preset condition.

15. The management system according to claim 14, wherein the determining, that the first data link has reached the preset condition is:
determining that a packet loss rate of the first data link has reached a preset packet loss rate threshold.

16. The management system according to claim 14, wherein determining that the first data link has reached the preset condition is:
determining that a ratio of a current specified rate of the first data link to average traffic that is within a preset time has not reached a preset ratio threshold.

17. The management system according to claim 14, wherein the LSW is further configured to:
decrease the bandwidth of the first data link when determining that the first data link has not reached the preset condition.

18. The management system according to claim 14, wherein increasing the bandwidth of the first data link is:
using bandwidth of a second data link that has not reached the preset condition to compensate the first data link.

19. The management system according to claim 10, wherein the attribute information comprises size information and/or volume label information of storage space of the to-be-created virtual non-volatile storage medium, and the volume label information identifies that the to-be-created virtual non-volatile storage medium can be uniquely accessed by the target blade server.

20. A system, comprising:
a plurality of blade servers;
a client having an associated physical non-volatile storage medium; and
a management device, wherein the management device comprises a central processing unit (CPU);
wherein the CPU is configured to:
receive a creation request message that is sent by the client requesting creation of a virtual non-volatile storage medium at the client corresponding to the physical non-volatile storage medium, the virtual non-volatile storage medium being created for a target blade server in the plurality of blade servers such that the virtual non-volatile storage medium is uniquely accessible to the target blade server;
forward the creation request message to the target blade server;
receive attribute information sent by the target blade server; and
send the attribute information to the client, such that the client creates, according to the attribute information, the virtual non-volatile storage medium.

21. A method comprising:
receiving, by a central processing unit (CPU) of a management device in a system, a creation request message that is sent by a client of the system, the client having an associated physical non-volatile storage medium, the creation request message requesting creation, at the client, of a virtual non-volatile storage medium that is uniquely accessible by a blade server of a plurality of blade servers, and the creation request message identifying the blade server of the plurality of blade servers, wherein the virtual non-volatile storage medium corresponds to the physical non-volatile storage medium;
forwarding, by the CPU of the management device, the creation request message to the blade server; and
receiving, by the CPU of the management device, attribute information sent by the blade server, and sending the attribute information to the client, so that the client creates, according to the attribute information, the virtual non-volatile storage medium.

* * * * *